(12) United States Patent
Kim

(10) Patent No.: US 10,152,238 B2
(45) Date of Patent: Dec. 11, 2018

(54) DATA PROCESSING SYSTEM WITH MEMORY SYSTEM USING FIRMWARES BASED ON OPERATING SYSTEMS LOADED INTO HOST AND OPERATING METHOD THEREOF

(71) Applicant: SK hynix Inc., Gyeonggi-do (KR)

(72) Inventor: Do-Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/476,382

(22) Filed: Mar. 31, 2017

(65) Prior Publication Data

US 2018/0052600 A1 Feb. 22, 2018

(30) Foreign Application Priority Data

Aug. 18, 2016 (KR) .................. 10-2016-0104907

(51) Int. Cl.
*G06F 12/00* (2006.01)
*G06F 3/06* (2006.01)

(52) U.S. Cl.
CPC ............ *G06F 3/061* (2013.01); *G06F 3/0604* (2013.01); *G06F 3/0631* (2013.01); *G06F 3/0653* (2013.01); *G06F 3/0659* (2013.01); *G06F 3/0673* (2013.01)

(58) Field of Classification Search
CPC ........ G06F 9/441; G06F 9/4406; G06F 3/061; G06F 3/0673; G06F 3/0659; G06F 3/0604; G06F 3/0631; G06F 3/0653; G06F 8/65; G06F 21/572
USPC .......................... 713/1, 2, 100; 711/170, 154
See application file for complete search history.

(56) References Cited

U.S. PATENT DOCUMENTS

| | | | | |
|---|---|---|---|---|
| 2006/0053274 A1* | 3/2006 | Nyuugaku | ................ | G06F 8/65 713/1 |
| 2008/0126879 A1* | 5/2008 | Tiwari | ................ | G06F 11/0712 714/46 |
| 2008/0184247 A1* | 7/2008 | Hughes | ................ | G06F 9/5055 718/104 |
| 2009/0064178 A1* | 3/2009 | Shamia | ................ | G06F 9/4405 719/313 |
| 2009/0271494 A1* | 10/2009 | Abercrombie | .......... | G06F 21/52 709/215 |
| 2010/0235615 A1* | 9/2010 | Manczak | ............... | G06F 9/4406 713/2 |
| 2011/0154351 A1* | 6/2011 | Henderson | ............ | G06F 9/5027 718/104 |
| 2011/0283297 A1* | 11/2011 | Mudusuru | ............... | G06F 9/541 719/328 |
| 2012/0159144 A1* | 6/2012 | Sengupta | ................ | G06F 9/441 713/100 |
| 2013/0124932 A1* | 5/2013 | Schuh | .................... | G11C 29/16 714/718 |

(Continued)

FOREIGN PATENT DOCUMENTS

KR 1020140097613 8/2014

*Primary Examiner* — Hong C Kim
(74) *Attorney, Agent, or Firm* — IP & T Group LLP

(57) ABSTRACT

A data processing system include: a host suitable for selecting and loading any one of a plurality of operating systems (OSs); and a memory system comprising a memory device and a controller that includes a plurality of firmwares, wherein the controller enables any one of the firmwares based on the OS loaded to the host, and controls an operation of the memory system based on the enabled firmware.

16 Claims, 11 Drawing Sheets

(56) References Cited

U.S. PATENT DOCUMENTS

| | | | | |
|---|---|---|---|---|
| 2013/0262848 A1* | 10/2013 | Chan | ............ | G06F 8/65 |
| | | | | 713/2 |
| 2014/0359640 A1* | 12/2014 | McNairy | ............ | G06F 9/441 |
| | | | | 719/318 |
| 2015/0113257 A1* | 4/2015 | Lewis | ............ | G06F 9/4806 |
| | | | | 713/1 |
| 2015/0277929 A1* | 10/2015 | Paul | ............ | G06F 9/441 |
| | | | | 713/2 |
| 2016/0124751 A1* | 5/2016 | Li | ............ | G06F 9/45541 |
| | | | | 380/44 |
| 2017/0139698 A1* | 5/2017 | Muroyama | ............ | G06F 8/65 |
| 2017/0168851 A1* | 6/2017 | Lin | ............ | G06F 8/654 |
| 2017/0329970 A1* | 11/2017 | Rothman | ............ | G06F 21/572 |

* cited by examiner

FIG. 6

| First OS | Identification information | Second OS | Identification information |
| --- | --- | --- | --- |
| | Description information | | Description information |
| | Region information | | Region information |
| | Firmware information | | Firmware information |
| Third OS | Identification information | Fourth OS | Identification information |
| | Description information | | Description information |
| | Region information | | Region information |
| | Firmware information | | Firmware information |
| ⋮ | ⋮ | ⋮ | ⋮ |

FIG. 7

```
[boot loader]
timeout=30
default=multi(0)disk(0)rdisk(0)partition(1)\WINDOWS
[operating systems]
multi(0)disk(0)rdisk(0)partition(1)\WINNT="Microsoft Windows 2000 Debug" /fastdetect /debug /debugport=COM1 /baudrate=19200
multi(0)disk(0)rdisk(0)partition(1)\WINNT="Microsoft Windows 2000 Professional" /fastdetect
multi(0)disk(0)rdisk(0)partition(3)\WINDOWS="Windows XP Debug" /fastdetect /debug /debugport=COM1 /baudrate=19200
multi(0)disk(0)rdisk(0)partition(3)\WINDOWS="Microsoft Windows XP Professional" /fastdetect
```

FIG. 8

| Bit | Description |
|---|---|
| 31:06 | Reserved |
| 05:03 | Commit Action (CA): This field specifies the action that is taken on the image downloaded with the Firmware Image Download command or on a previously downloaded and placed image. The actions are indicated in the following table.<br><br>| Value | Definition |<br>|---|---|<br>| 000b | Downloaded image replaces the image specified by the Firmware Slot field. This image is not activated. |<br>| 001b | Downloaded image replaces the image specified by the Firmware Slot field. This image is activated at the next reset. |<br>| 010b | The image specified by the Firmware Slot field is activated at the next reset. |<br>| 011b | The image specified by the Firmware Slot field is requested to be activated immediately without reset. |<br>| 100-111b | Reserved | |
| 02:00 | Firmware Slot (FS): Specifies the firmware slot that shall be used for the Commit Action, if applicable. If the value specified is 0h, then the controller shall choose the firmware slot (slot 1 – 7) to use for the operation. |

FIG. 9

| Bit | Description | Bit | Description |
|---|---|---|---|
| 6:8 | First firmware | 9:11 | Second firmware |
| 12:14 | Third firmware | 15:17 | Fourth firmware |
| 18:20 | Fifth firmware | 21:23 | Sixth firmware |
| 24:26 | Seventh firmware | 27:31 | reserved |

DATA PROCESSING SYSTEM WITH MEMORY SYSTEM USING FIRMWARES BASED ON OPERATING SYSTEMS LOADED INTO HOST AND OPERATING METHOD THEREOF

CROSS-REFERENCE TO RELATED APPLICATIONS

This U.S. non-provisional patent application claims priority under 35 U.S.C. § 119(a) to Korean Patent Application No. 10-2016-0104907, filed on Aug. 18, 2016 in the Korean Intellectual Property Office (KIPO), the disclosure of which is incorporated herein by reference in its entirety.

BACKGROUND

1. Field

Exemplary embodiments of the present invention relate to a data processing system and an operating method thereof.

2. Description of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for data storage. A memory system may be used as a main or an auxiliary memory device of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

A data processing system includes a memory system that is coupled to a host. The data processing system may have a plurality of operating systems (OSs) and may selectively execute any one of the OSs according to the use purpose thereof. However, the use efficiency of such systems is typically low. Therefore, it is desirable to develop a data processing system capable of maximizing the use efficiency of the memory system or systems employed therein.

SUMMARY

The present invention provides a data processing system exhibiting an enhanced use efficiency of one or more memory systems employed therein. The data processing system employs one or more memory systems having a plurality of firmware. Each of the plurality of firmware may be selected to work together with one or more operating systems of the data processing system.

In an embodiment, a data processing system may include: a host suitable for selecting and loading any one of a plurality of operating systems (OSs); and a memory system comprising a memory device and a controller that includes a plurality of firmwares, The controller enables any one of the firmwares based on the OS loaded to the host, and controls an operation of the memory system based on the enabled firmware.

The controller may receive a command for selecting any one of the firmwares from the host, and may set and enable any one of the firmwares based on the command.

The controller may analyze bit positions in a bit string contained in the command, and may set any one of the firmwares.

The bit positions may be allocated to the respective firmwares.

The host may select any one of the OSs in response to a power-on, and loads the selected OS.

The host may generate the command based on the selected OS, and then transmit the generated command to the memory system.

The host may set firmware which is to be enabled in the memory system, in response to the selected OS, and may generate the command based on information for identifying the set firmware.

The host may store information on relations between the OSs and the firmwares.

The host may provide a screen for selecting any one of the OSs to a user, in response to the power-on, and may set the selected OS among the OSs when any one of the OSs is selected by the user.

While the host is operated according to the loaded OS, the controller may control a data access operation requested for the memory device by the host, based on the enabled firmware.

In an embodiment, an operating method of a data processing system which includes a host and a memory system, the operating method comprising: providing a plurality of operating systems (OSs) in the host and a plurality of firmwares in the memory system; selecting and loading, by the host, any one of the OSs; selecting and enabling, by the memory system, any one of the firmwares, in response to the selecting and loading of any one of the OSs; and controlling an operation of a memory device included in the memory system, based on the firmware of the memory system, which is enabled at the selecting and enabling of any one of the firmwares.

The selecting and enabling of any one of the firmwares may include: generating, by the host, a command for selecting any one of the firmwares included in the memory system, and transmitting the generated command to the memory system; and setting and enabling, by the memory system, any one of the firmwares, based on the command transmitted to the memory system.

The setting and enabling of any one of the firmwares may include analyzing, by the memory system, bit positions in a bit string contained in the command transmitted to the memory system, and setting and enabling any one of the firmwares.

The bit positions may be allocated to the respective firmwares.

The selecting and loading of any one of the OSs may include: selecting, by the host, any one of the OSs in response to a power-on; and loading, by the host, the OS selected at the selecting of anyone of the OSs.

The transmitting of the generated command may include: generating, by the host, the command based on the OS selected at the selecting of any one of the OSs; and transmitting the generated command to the memory system.

The generating of the command may include: setting firmware which is to be enabled in the memory system, in response to the OS selected at the selecting of any one of the OSs; and generating, by the host, the command based on information for identifying the firmware set at the setting of the firmware.

The host may store information on relations between the OSs and the firmwares.

The selecting of any one of the OSs may include: providing a screen for selecting any one of the OSs to a user in response to the power-on; and setting the selected OS among the OSs, when any one of the OSs is selected by the user.

The controlling of the operation of the memory device may be controlling a data access operation requested for the memory device of the memory system by the host, based on the firmware of the memory system, which is enabled at the selecting and enabling of any one of the firmwares, while the host is operated according to the OS loaded at the selecting and loading of any one of the OSs.

In an exemplary embodiment of the present invention, an operating method of a data processing system, may comprise: providing a host and a memory system coupled to the host, the host includes a plurality of operating systems (OSs), and the memory system includes a plurality of firmwares; loading a first OS selected from the plurality of OSs by the host; enabling a suitable firmware selected from the plurality of firmwares in response to the first OS; and accessing a memory device included in the memory system, based on the suitable firmware.

BRIEF DESCRIPTION OF THE DRAWINGS

These and other features and advantages of the present invention will become apparent to those skilled in the relevant art from the following detailed description in reference to the accompanying drawings, wherein:

FIGS. 6 to 9 are diagrams for describing the operating method of a data processing system, in accordance with an exemplary embodiment of the present invention.

DETAILED DESCRIPTION

Figure 1:
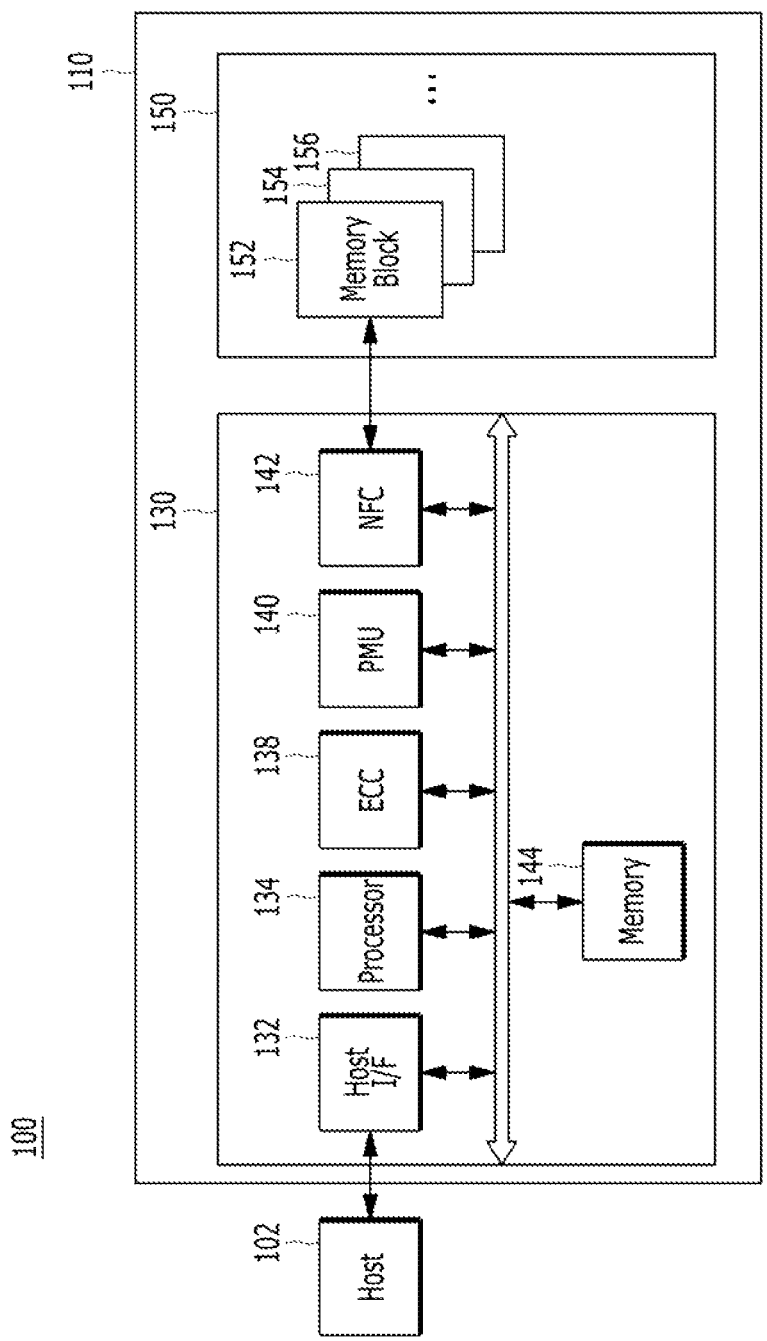
FIG. 1 is a diagram illustrating a data processing system including a memory system, according to an exemplary embodiment of the present invention.

Although, the invention is described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a diagram illustrating a data processing system 100 including a memory system 110 in accordance with an embodiment.

Referring to FIG. 1, the data processing system 100 may include a host 102 and a memory system 110.

The host 102 may be or include one or more of electronic devices such as a smart phone, table PC, mobile phone, video phone, E-book reader, desktop PC, laptop PC, netbook computer, workstation, server, PDA, Portable Multimedia Player (PMP), PM3 player, medical device, camera and wearable device. The wearable device may be or include one or more of an accessory-type device (for example, a watch, ring, bracelet, ankle bracelet, necklace, eyeglasses, contact lens or head-mounted-device (HMD)), smart fabric or clothing (for example, electronic clothing), a body-attached device (for example, skin pad or tattoo) and a transplantation circuit. In certain embodiments, the electronic device may be or include one or more of a television, Digital Video Disk (DVD) player, audio player, refrigerator, air-conditioner, vacuum cleaner, oven, microwave, washing machine, air cleaner, set-top box, home automation control panel, security control panel, media box (for example, Samsung HomeSync™, Apple TV™ or Google TV™), game console (for example, Xbox™ or PlayStation™), electronic dictionary, electronic key, camcorder and electronic picture frame.

In an embodiment, the electronic device may be or include one or more of various medical devices, for example, various portable measuring devices, blood glucose monitoring device, heart rate monitoring device, blood pressure measuring instrument and body temperature measuring instrument, Magnetic Resonance Angiography (MRA) machine, Magnetic Resonance Imaging (MRI) machine, Computed Tomography (CT) machine, and ultrasound system), a navigation device, Global Navigation Satellite System (GNSS), Event Data Recorder (EDR), Flight Data Recorder (FDR), vehicle infotainment device, marine electronic equipment (for example, marine navigation equipment or gyrocompass), avionics, security device, vehicle head unit, industrial or home robot, drone, ATM of a financial institution, Point Of Sales (POS) of a store, and Internet Of Things (IOT) devices (for example, bulb, various sensors, sprinkler, fire alarm, temperature controller, streetlamp, toaster, sports equipment, hot water tank, heater and boiler). In accordance with an embodiment, the electronic device may be or include one or more of a part of furniture, building/structure or vehicle, electronic board, electronic signature receiving device, projector and various measuring instruments (for example, water supply, electricity, gas and wave measuring instruments).

In accordance with an embodiment, the host 102 may include one or more Operating Systems (OSs). The OS may manage and control the overall functions of the host 102, and may provide an interaction between the host 102 and a user. The OS may have a function which is decided according to the use purpose thereof. For example, the OS may be divided into a general OS and a mobile OS, depending on the mobility of the host 102. The general OS may be divided into a personal OS and an enterprise OS, depending on the use environment thereof. The personal OS may be focused on providing a service to general users, and include Window and Chrome, for example. The enterprise OS may be focused on securing high performance, and include Windows Server, Unux and Unix, for example. The mobile OS may be focused on reducing power consumption, and include Android, OS X and Windows Mobile, for example. In accordance with an embodiment, the host 102 may include a plurality of OSs. At this time, the host 102 may set any one of the OSs in response to a power-on.

The host 102 may select a firmware among a plurality of available firmwares corresponding to a selected OS. The firmware may serve to drive the memory system 110 in response to an operation of the host 102. The firmware may have a function which is set according to the use purpose thereof. The host 102 may decide the use purpose of the firmware according to the use purpose of the OS, and set the firmware based on the use purpose. For this operation, the host 102 may store information on the relation between the OS and the firmware. The host 102 may transmit an activation command to the memory system 110. The activation command may indicate the firmware corresponding to the OS.

In accordance with an embodiment, the host 102 may select and load an OS from a plurality of available OSs. For example, the host 102 may execute the OS after booting. Through this operation, the host 102 may be operated according to the loaded OS.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 and a controller 130. The memory device 150 may store data to be accessed by the host 102, and the controller 130 may control data exchange between the memory device 150 and the host 102. Under the control of the controller 130, data received from the host 102 may be stored in the memory device 150.

The controller 130 and the memory device 150 may be integrated into one semiconductor device. For instance, the controller 130 and the memory device 150 may be integrated into one semiconductor device to form a solid-state drive (SSD). When the memory system 110 is used as an SSD, the operation speed of the host 102 that is electrically coupled with the memory system 110 may be significantly increased.

The controller 130 and the memory device 150 may be integrated into one semiconductor device to form a memory card, such as, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The memory system 110 may be configured as one part of an electronic device or system including, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells electrically coupled to a plurality of word lines (WL). The memory cells may be single bit cells or multi-bit cells. The memory cells may be arranged in a two or a three-dimensional stacked structure. The memory device 150 may be a nonvolatile memory device, for example, a flash memory. The flash memory may have a three-dimensional (3D) stack structure. A three-dimensional (3D) stack structure of the memory device 150 will be described later with reference to FIGS. 2 to 4.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control the overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols, such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than a threshold number of correctable error bits, and may output an error correction fail signal indicating failure in correcting the error bits.

The ECC unit 138 may perform an error correction operation based on a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory. Other well-known memory interfaces may be used depending upon the type of memory device employed.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory such as a static random access memory (SRAM) or a dynamic random access memory (DRAM). As described above, the memory 144 may store data used by the host 102 and the memory device 150 for the read and write operations. For such storage of the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive one or more firmware to control the general operations of the memory system 110. For example, the firmware may be a flash translation layer (FTL). The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail may seriously deteriorate the utilization efficiency of the memory device 150 having a 3D stack structure and the reliability of the memory system 100, and thus reliable bad block management may be needed. Bad block management units are well-known and will therefore not be described in any further detail hereinafter.

Figure 2:
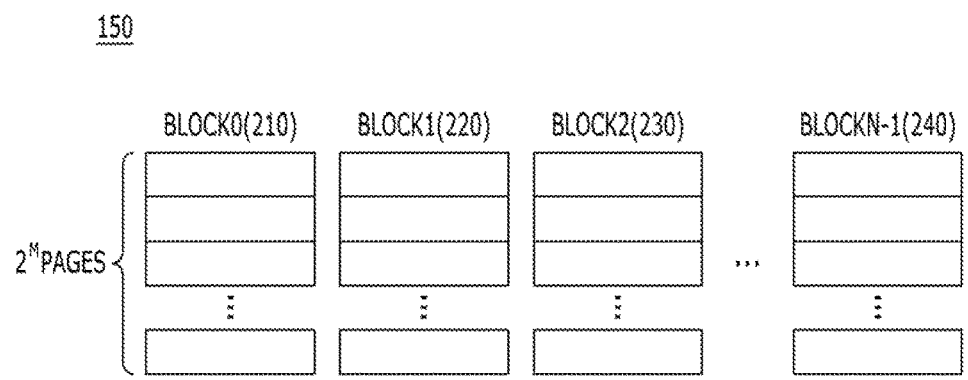
FIG. 2 is a diagram illustrating an example of a memory device employed in the memory system of FIG. 1.

FIG. 2 is a diagram of the memory device 150 shown in FIG. 1.

Referring to FIG. 2, the memory device 150 may include a plurality of memory blocks, for example, a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, $2^M$ number of pages ($2^M$ PAGES). Each of the pages may include a plurality of memory cells which are electrically coupled to a plurality of word lines.

Also, the memory device 150 may include a plurality of memory blocks, as single level cell (SLC) memory blocks and multi-level cell (MLC) memory blocks, according to the number of bits which may be stored or expressed in each memory cell. A SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may also be referred to as a triple level cell (TLC) memory block.

Each of the memory blocks 210 to 240 may store the data provided from the host 102 during a write operation, and provide the stored data to the host 102 during a read operation.

Figure 3:
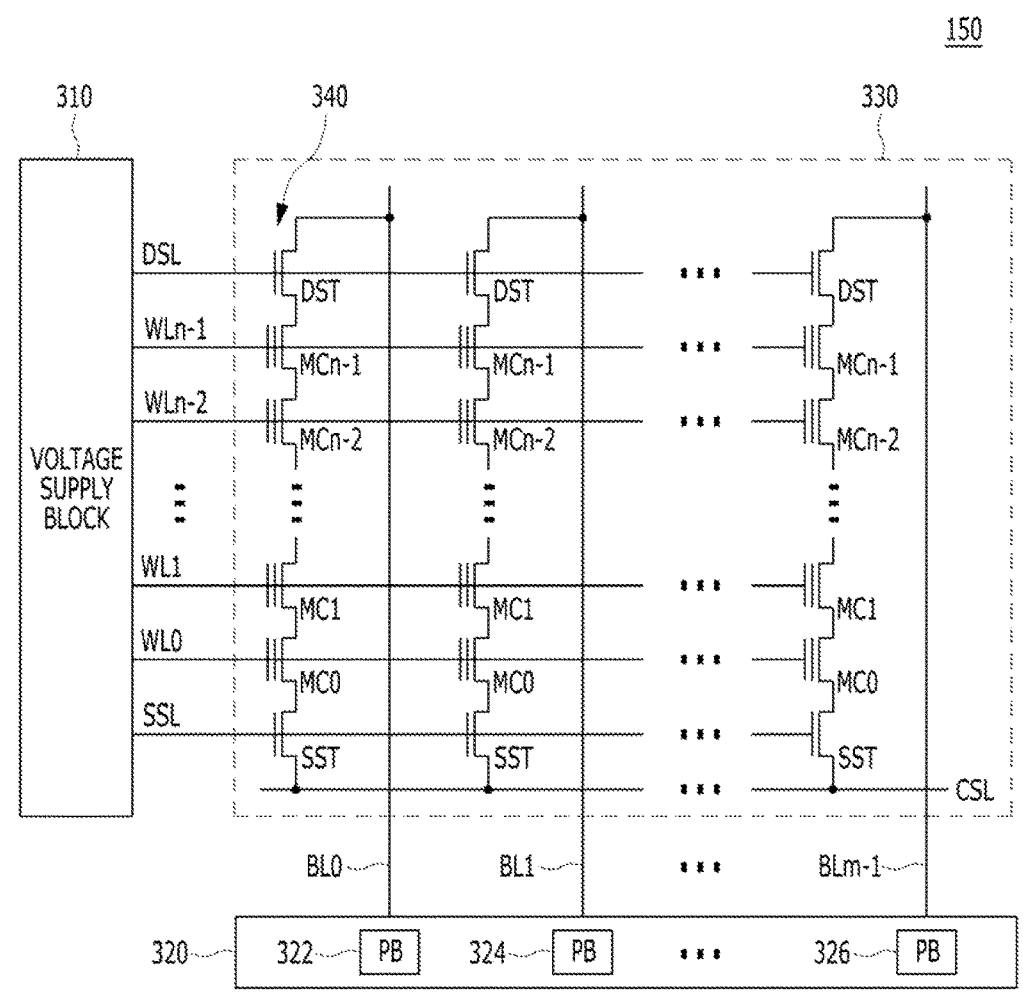
FIG. 3 is a circuit diagram illustrating a memory block in a memory device, according to an exemplary embodiment of the present invention.

FIG. 3 is a diagram illustrating a memory device 150 including the memory block shown in FIG. 2. FIG. 3 shows a configuration of a single memory block 330 and circuits related thereto 310 and 320.

Referring to FIG. 3, the memory block 330 may include a plurality of cell strings 340 which are electrically coupled to bit lines BL0 to BLm−1, respectively. The cell string 340 of each column may include at least one drain select transistor (i.e., string select transistor) DST and at least one source select transistor (i.e., ground select transistor) SST. A plurality of memory cell transistors MC0 to MCn−1 may be electrically coupled in series between the select transistors SST and DST. The respective memory cells MC0 to MCn−1 may be configured by multi-level cells (MLC) each of which stores data information of a plurality of bits. The cell strings 340 may be electrically coupled to the corresponding bit lines BL0 to BLm−1, respectively. For reference, in FIG. 3, 'DSL' may denote a drain select line (i.e., a string select line), 'SSL' may denote a source select line (i.e., a ground select line), and 'CSL' may denote a common source line.

While FIG. 3 shows, as an example, that the memory block 330 may be configured by NAND flash memory cells, it is noted that the memory block 330 of the memory device 150 is not limited only to a NAND flash memory. In other embodiments, the memory block 330 may be realized, for example, by a NOR flash memory, a hybrid flash memory in which at least two kinds of memory cells are combined, or one-NAND flash memory in which a controller is built in a memory chip. Further, it is noted that the operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers (PBs) 322, 324 and 326 respectively corresponding to columns (or bit lines) or pairs of columns (or pairs of bit lines), and a plurality of latches (not shown) may be included in each of the page buffers (PBs) 322, 324 and 326.

The memory device 150 may be realized as a 2-dimensional or 3-dimensional memory device. For example, as shown in FIG. 4, in the case where the memory device 150 is realized as a 3-dimensional nonvolatile memory device, the memory device 150 may include a plurality of memory blocks BLK0 to BLKN−1.

Figure 4:
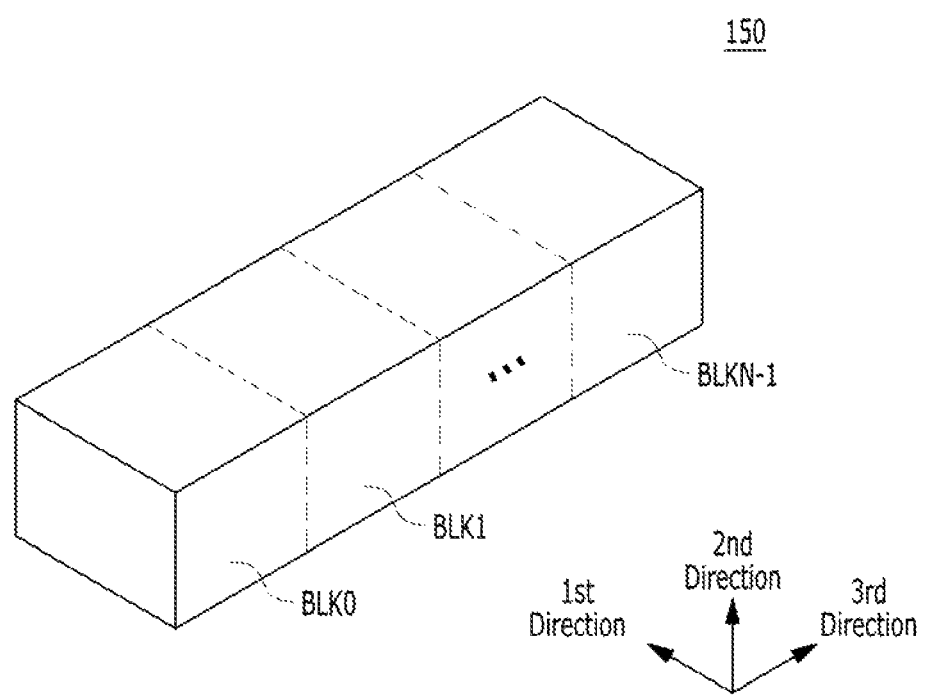
FIG. 4 is a diagram schematically illustrating a configuration of a memory device, according to an exemplary embodiment of the present invention.

FIG. 4 is a diagram illustrating the memory blocks of the memory device 150 shown in FIG. 3, and the memory blocks BLK0 to BLKN−1 may be realized as a 3-dimensional structure (or a vertical structure). For example, the respective memory blocks BLK0 to BLKN−1 may be realized as a 3-dimensional structure by including a structure which extends in first to third directions (for example, the x-axis direction, the y-axis direction and the z-axis direction).

The respective memory blocks BLK0 to BLKN−1 may include a plurality of NAND strings extending in the second direction. The plurality of NAND strings may be spaced apart in the first direction and the third direction. Each NAND string may be electrically coupled to a bit line, at least one drain select line, at least one ground select line, a plurality of word lines, at least one dummy word line, and a common source line. Namely, the respective memory blocks BLK0 to BLKN−1 may be electrically coupled to a plurality of bit lines, a plurality of drain select lines, a plurality of ground select lines, a plurality of word lines, a plurality of dummy word lines, and a plurality of common source lines. The aforementioned three-dimensional structure is only an example of a many different possible configurations which may be employed in implementing the present invention.

Figure 5:
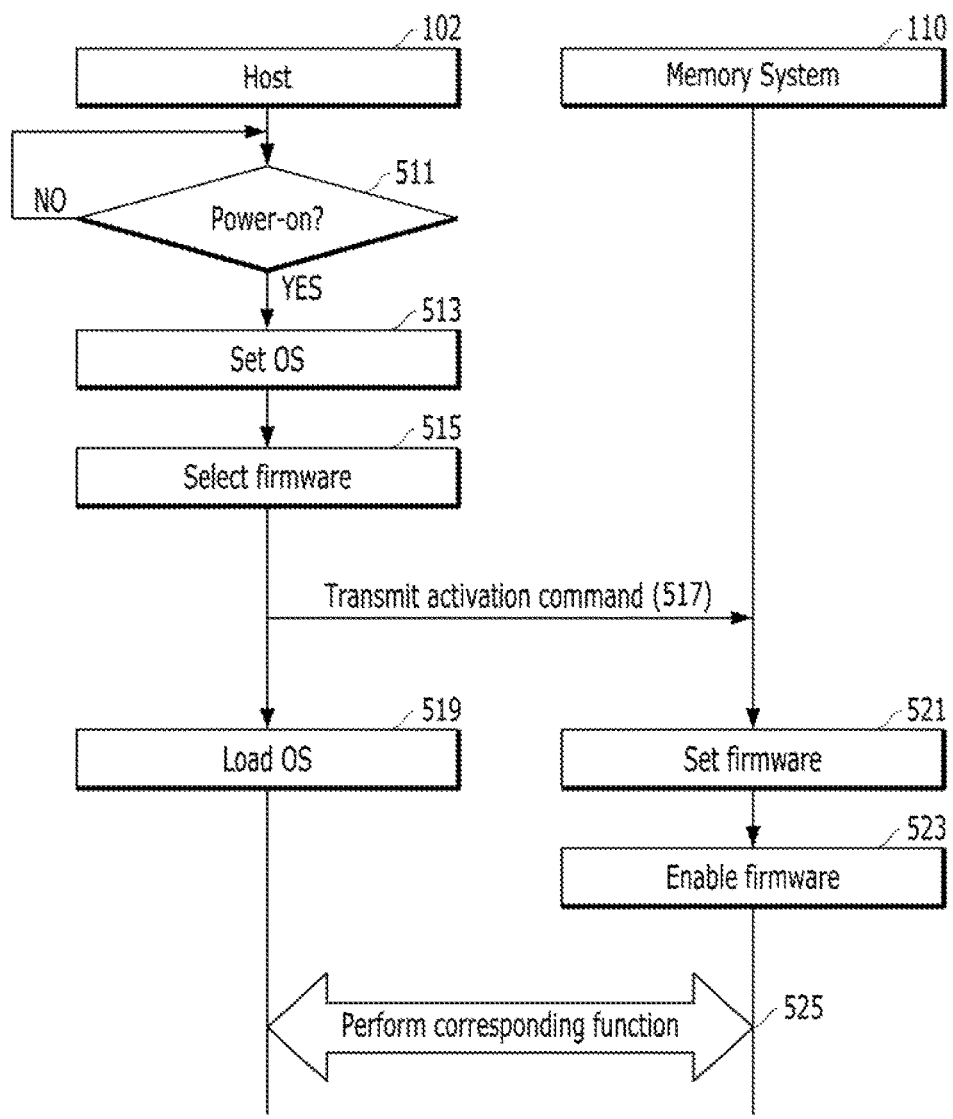
FIG. 5 is a diagram illustrating an operating method of a data processing system, in accordance with an exemplary embodiment of the present invention.

FIG. 5 is a diagram illustrating an operating method of a data processing system in accordance with an embodiment. FIGS. 6 to 9 are diagrams for describing the operating method of a data processing system in accordance with an embodiment.

Referring to FIG. 5, the operating method of a data processing system 100 in accordance with an embodiment may start with step 511 at which the host 102 senses a power-on. For example, the host 102 may include a power key for power-on or off. When the power key is selected by a user of the host 102 in a state where the host 102 is powered off, the host 102 may be powered on.

Then the host 102 may set an OS at step 513. The host 102 may include one or more OSs. Each OS may manage and control the overall functions of the host 102, and provide an interaction between the host 102 and a user. Each OS may have a function which is set according to the use purpose thereof. For example, the OS may be or divided into a general OS and a mobile OS, depending on the mobility of the host 102. The general OS may be or divided into a personal OS and an enterprise OS, depending on the use environment thereof. The personal OS may be focused on providing a service to general users, and may be or include Window and Chrome, for example. The enterprise OS may be focused on securing high performance, and may be or include Windows Server, Linux and Unix, for example. The mobile OS may be focused on reducing power consumption, and may be or include Android, OS X and Windows Mobile, for example.

In accordance with an exemplary embodiment, the host 102 may include a plurality of OSs. In this case, the host 102 may set any one of the OSs through a boot loader as illustrated in FIG. 6. At this time, any one of the operating systems may be set to a default OS. Furthermore, a time interval may be set to select the default OS. The OSs may be arranged in a predetermined order of arrangement. For example, when a power-on is sensed, the host 102 may output a screen for selecting any one of the OSs. When an input of the user to select any one of the OSs through the screen is sensed, the host 102 may set any one of the OSs. On the other hand, when an input of the user is not sensed during a predetermined time interval, the host 102 may set the default OS.

For example, the host 102 may include a first OS, a second OS, a third OS and a fourth OS. Here, the third OS may be set to the default OS. Furthermore, the time interval for selecting the default OS may be set to 30 seconds. Through the settings, the host 102 may set any one of the first to fourth OSs, based on an input of a user. Alternatively, the host 102 may set the third OS when 30 a time, for example, 30 seconds elapse without an input of a user.

The host 102 may select a firmware for the memory system 110 at step 515. The firmware may serve to drive the memory system 110 in response to an operation of the host 102. The firmware may have a function which is set according to the use purpose thereof. At this time, the host 102 may select the firmware based on the selected OS. The host 102 may decide the use purpose of the firmware according to the use purpose of the OS, and set the firmware based on the use purpose. For this operation, the host 102 may store information on the relation between the OS and the firmware.

In accordance with an exemplary embodiment, the host 102 may store configuration information for each OS, as shown in FIG. 7. For example, the configuration information for each OS may include boot configuration data (BCD). The configuration information for each OS may include identification information, description information, region information and firmware information for each OS. The identification information may be set by the boot loader, according to the order of arrangement. The region information may include a path to the corresponding OS and partitions of the corresponding OS. The firmware information may indicate information for identifying firmware corresponding to the OS. The host 102 may select firmware information corresponding to the OS, based on the configuration information for each OS.

For example, the host 102 may include a first OS, a second OS, a third OS and a fourth OS. The first OS may correspond to a first firmware, the second OS may correspond to a second firmware, the third OS may correspond to a third firmware, and the fourth OS may correspond to a fourth firmware. When the first OS is set, the host 102 may select the first firmware in response to the first OS. When the second OS is set, the host 102 may set the second firmware in response to the second OS. When the third OS is set, the host 102 may set the third firmware in response to the third OS. When the fourth OS is set, the host 102 may set the fourth firmware in response to the fourth OS.

After selecting the firmware that corresponds to the set OS, the host 102, at step 517, may then transmit an activation command to the memory system 110. The activation command may indicate the firmware corresponding to the set OS. At this time, the activation command may indicate the firmware to set and enable the firmware corresponding to the OS in the memory system 110 in steps 521 and 523. The host 102 may generate the activation command based on the firmware information corresponding to the OS.

In accordance with an exemplary embodiment, the host 102 may generate an activation command as illustrated in FIG. 8. The host 102 may indicate the firmware information through bit positions in a bit string of the activation command. The host 102 may generate an activation command using a firmware commit command for the memory system 110. At this time, a bit string corresponding to bit positions from the sixth bit position to the 31st bit position in the firmware commit command may correspond to reserved bits.

At this time, as illustrated in FIG. 9, three bit positions in the reserved bits of the activation command may be allocated to the respective pieces of firmware. Among the reserved bits, the sixth to eighth bit positions may be allocated to the first firmware, the ninth to 11th bit positions may be allocated to the second firmware, the 12th to 14th bit positions may be allocated to the third firmware, the 15th to 17th bit positions may be allocated to the fourth firmware, the 18th to 20th bit positions may be allocated to the fifth firmware, the 21st to 23rd bit positions may be allocated to the sixth firmware, and the 24th to 26th bit positions may be allocated to the seventh firmware. At this time, the host 102 may represent any one of the firmwares using any one bit value of '001', '010', '011', '100', '101', '110' and '111', and represent the others of the firmwares as a bit value of '000'. As such, a maximum of seven firmwares may be identified through the activation command.

For example, when the first firmware is set, the host 102 may represent the sixth to eighth bit positions as any one of '001', '010', '011', '100', '101', '110' and '111' in the activation command, and represent the ninth to 31st bit positions using a bit value of '000'. When the second firmware is set, the host 102 may represent the ninth to 11th bit positions in the activation command as any one bit value of '001', '010', '011', '100', '101', '110' and '111', and represent the sixth to eighth bit positions and the 12th to 31st bit positions as a bit value of '000'. When the third firmware is set, the host 102 may represent the 12th to 14th bit positions in the activation command as any one bit value of '001', '010', '011', '100', '101', '110' and '111', and represent the sixth to 11th bit positions and the 15th to 31st bit positions as a bit value of '000'. When the fourth firmware is set, the host 102 may represent the 15th to 17th bit positions in the activation command as any one bit value of '001', '010', '011', '100', '101', '110' and '111', and represent the sixth to 14th bit positions and the 18th to 31st bit positions as a bit value of '000'.

Returning to FIG. 5, the host 102 may load the OS at step 519. At this time, the host 102 may execute the OS after booting. Through this operation, the host 102 may be operated according to the activated OS.

When the activation command for a firmware corresponding to the OS is received from the host 102 at step 517, the memory system 110 may set firmware at step 521. At this time, the memory system 110 may set firmware based on the activation command. For this operation, the memory system 110 may analyze the activation command. At this time, the memory system 110 may acquire firmware information from the activation command. The memory system 110 may set firmware in response to the firmware information.

In accordance with an exemplary embodiment, the memory system 110 may include a plurality of firmwares. In this case, the memory system 110 may set any one of the firmwares, based on the activation command of the host 102. For example, the memory system 110 may decide any one of the firmwares in response to the firmware information of the activation command. The memory system 110 may detect an activation command as illustrated in FIG. 8. At this time, the memory system 110 may acquire firmware information through the bit positions in the bit string of the activation command. The memory system 110 may acquire the firmware information, based on the bit values of bits corresponding to bit positions from the sixth bit position to the 31st position, which are the reserved bits in the firmware commit command. At this time, as illustrated in FIG. 9, three bit positions in the reserved bits for the activation command may be allocated to each of the firmwares. Any one of the firmwares may be represented by any one bit value of '001', '010', '011', '100', '101', '110' and '111' in the reserved bits, and the others of the firmwares may be represented by a bit value of '000'.

For example, the memory system 110 may include first firmware, second firmware, third firmware and fourth firmware. When the bit value of the sixth to eighth bit positions in the activation command is any one of '001', '010', '011', '100', '101', '110' and '111' and the bit values of the ninth to 31st bit positions is '000', the memory system 110 may set the first firmware. When the bit value of the ninth to 11th bit positions in the activation command is any one of '001', '010', '011', '100', '101', '110' and '111' and the bit values of the sixth to eighth bit positions and the 12th to 31st bit positions are '000', the memory system 110 may set the second firmware. When the bit value of the 12th to 14th bit positions in the activation command is any one of '001', '010', '011', '100', '101', '110' and '111' and the bit values of the sixth to 11th bit positions and the 15th to 31st bit positions are '000', the memory system 110 may set the third firmware. When the bit value of the 15th to 17th bit positions in the activation command is any one of '001', '010', '011', '100', '101', '110' and '111' and the bit values of the sixth to 14th bit positions and the 18th to 31st bit positions are '000', the memory system 110 may set the fourth firmware.

The memory system 110 may enable the firmware at step 523. That is, the memory system 110 may execute the firmware. Through this operation, the memory system 110 may execute the firmware, in response to the OS of the host 102. The memory system 110 may be driven, based on the firmware.

For example, the memory system 110 may include first firmware, second firmware, third firmware and fourth firmware. The memory system 110 may enable any one of the first firmware, the second firmware, the third firmware and the fourth firmware.

The host 102 and the memory system 110 may each perform a corresponding function at step 525. For example, the host 102 may be operated according to the OS. The memory system 110 may support a data access operation requested for the memory device 150 by the host 102, based on the enabled firmware. That is, while the host 102 is operated according to the OS, the controller 130 included in the memory system 110 may control the data access operation requested for the memory device 150 by the host 102, based on the enabled firmware.

For example, while the host 102 is operated according to the first OS, the memory system 110 may be driven based on the first firmware. Alternatively, while the host 102 is operated according to the second OS, the memory system 110 may be driven based on the second firmware. Alternatively, while the host 102 is operated according to the third OS, the memory system 110 may be driven based on the third firmware. Alternatively, while the host 102 is operated according to the fourth OS, the memory system 110 may be driven based on the fourth firmware.

Figure 10:
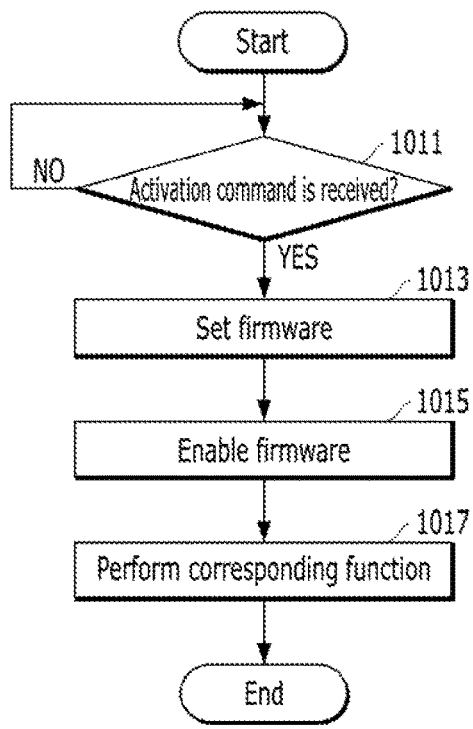
FIG. 10 is a flowchart illustrating an operating method of a data processing system, in accordance with an exemplary embodiment of the present invention.

FIG. 10 is a flowchart illustrating an operating method of a data processing system in accordance with an embodiment.

Referring to FIG. 10, the operating method of the memory system 110 starts with step 1011 at which the controller 130 receives an activation command. At this time, when the activation command is received from the host 102 through the host interface unit 132, the processor 134 may sense the activation command. The activation command may indicate a firmware corresponding to the OS of the host 102. For example, the activation command may have the same structure as or a different structure from the firmware commit command.

The controller 130 may set the firmware based on the activation command, at step 1013. At this time, the processor 134 may analyze the activation command. Through this operation, the processor 134 may acquire firmware information from the activation command and may set the firmware in response to the firmware information.

Then, the controller 130 may enable the firmware at step 1015. At this time, the processor 134 may execute the firmware of the memory device 150. For this operation, the processor 134 may be interfaced with the memory device 150 through a NAND flash controller 142. Through this operation, the controller 130 may be driven based on the firmware.

Finally, the controller 130 may perform the corresponding function at step 1017. The corresponding function may be an operation, such as a read or a program operation requested by the host. For example, while the host 102 is operated according to the selected and loaded OS, the processor 134 may support an operation requested by the host based on the firmware corresponding to the selected and loaded OS of the host.

In accordance with an embodiment, the memory system 110 may effectively use a plurality of firmwares according to a use purpose. That is, the memory system 110 may adaptively use the firmwares in response to the OS executed in the host 102 for improving the use efficiency of the memory system 110.

Thus, the data processing system and the operating method thereof can improve the use efficiency of the memory device employed therein, and may more rapidly and stably process data to the memory device.

Figure 11:
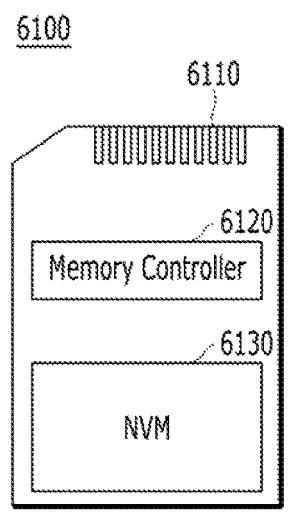
FIGS. 11 to 16 are diagrams illustrating various memory systems, according to exemplary embodiments of the present invention.

FIG. 11 is a diagram illustrating a data processing system including the memory system according to an embodiment. Specifically, FIG. 11 illustrates a memory card system 6100.

Referring to FIG. 11, the memory card system 6100 may include a memory controller 6120, a memory device 6130, and a connector 6110.

The memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless-fidelity (WI-FI) and Bluetooth. Accordingly, the memory system and the data processing system according to an embodiment may be applied to wired and/or wireless electronic appliances, for example, a mobile electronic appliance.

The memory device 6130 may be implemented with a nonvolatile memory (NVM). For example, the memory device 6130 may be implemented with various nonvolatile memory devices such as an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid-state driver (SSD) by being integrated into a single semiconductor device. The memory controller 6120 and the memory device 6130 may construct a memory card such as a PC card (Personal Computer Memory Card International Association; PCM-CIA), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 12:
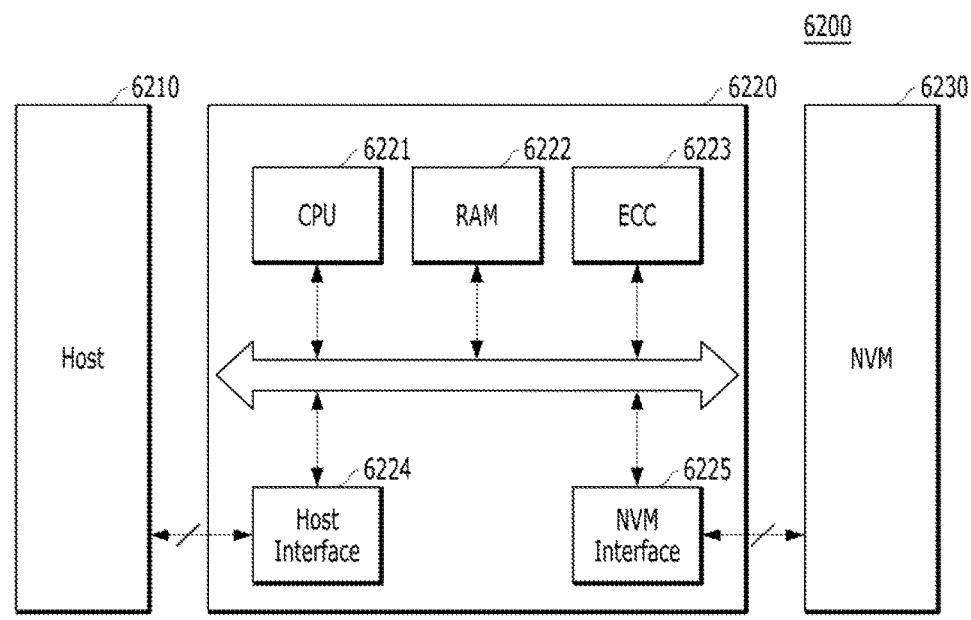

FIG. 12 is a diagram illustrating an example of a data processing system 6200 including a memory system according to an exemplary embodiment of the present invention.

Referring to FIG. 12, a data processing system 6200 may include a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 may be temporarily stored in the RAM 6222. In the case where the RAM 6222 is used as a buffer memory, the RAM 6222 may be used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to an embodiment may be applied to wired and/or wireless electronic appliances, for example, a mobile electronic appliance.

Figure 13:
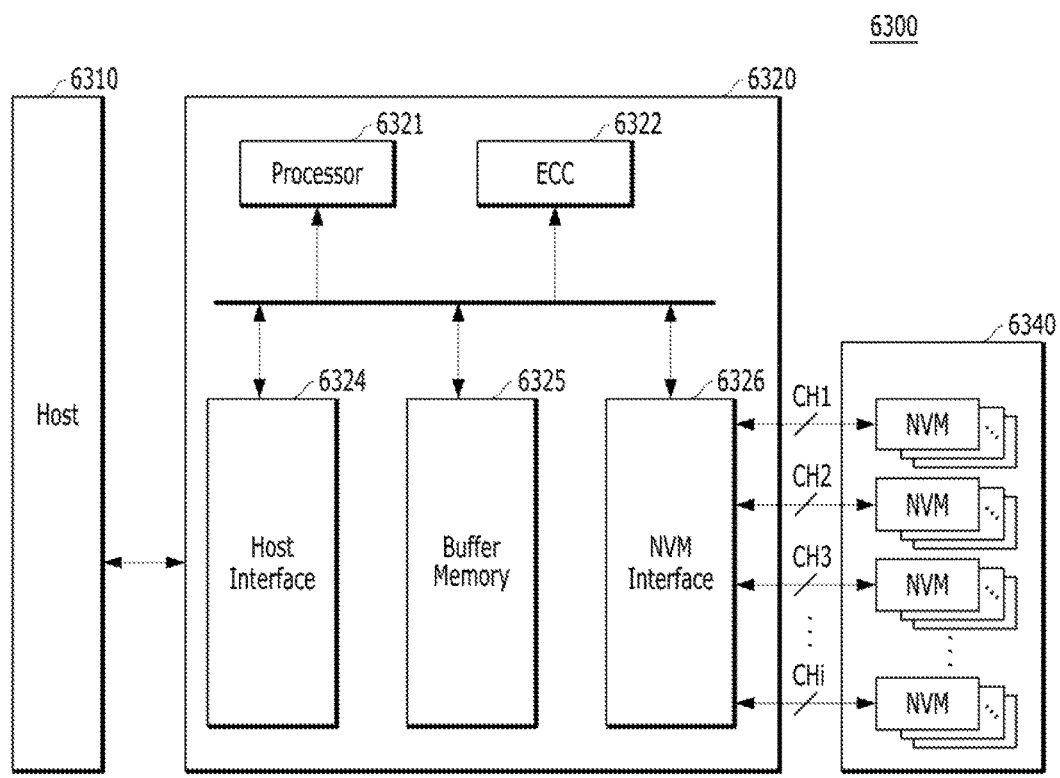

FIG. 13 is a diagram illustrating an example of a data processing system including a memory system according to an exemplary embodiment of the invention. FIG. 13 may be a solid state drive (SSD) 6300.

Referring to FIG. 13, an SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

The controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 may temporarily store data received from a host 6310 or data received from a plurality of nonvolatile memories NVMs included in the memory device 6340, or temporarily store metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase-change random access memory (PRAM). While it is illustrated in FIG. 13, for the sake of convenience in explanation, that the buffer memory 6325 is disposed inside the controller 6320, it is to be noted that the buffer memory 6325 may be disposed outside the controller 6320.

The ECC circuit 6322 may calculate error correction code values of data to be programmed in the memory device 6340 in a program operation, perform an error correction operation for data read from the memory device 6340, based on the error correction code values, in a read operation, and perform an error correction operation for data recovered from the memory device 6340 in a recovery operation for failed data.

The host interface 6324 may provide an interface function with respect to an external device such as the host 6310. The nonvolatile memory interface 6326 may provide an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (for example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (for example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 14:
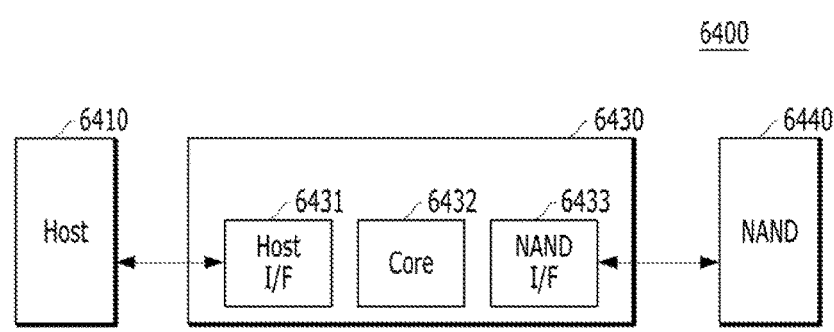

FIG. 14 is a diagram illustrating another example of a data processing system including the memory system according to an exemplary embodiment of the present invention. FIG. 14 is a drawing illustrating an embedded multimedia card (eMMC) 6400 to which a memory system according to an embodiment is applied.

Referring to FIG. 14, an eMMC 6400 may include a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 15:
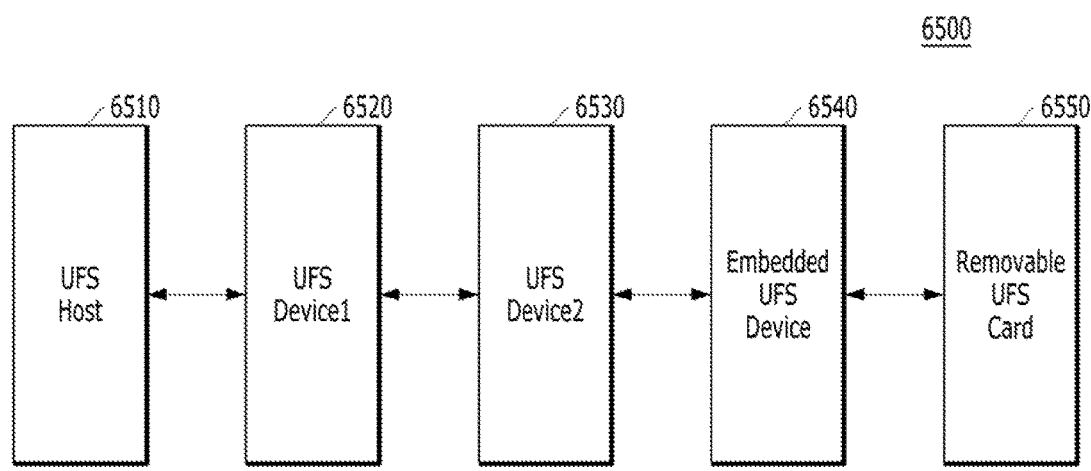

FIG. 15 is a diagram illustrating another example of a data processing system including a memory system according to an exemplary embodiment of the present invention. FIG. 15 is a drawing illustrating a universal flash storage (UFS) system 6500 to which the memory system according to an embodiment is applied.

Referring to FIG. 15, a UFS system 6500 may include a UFS host 6510, a plurality of UFS devices 6520 and 6530, an embedded UFS device 6540, and a removable UFS card 6550. The UFS host 6510 may be an application processor of wired and/or wireless electronic appliances, for example, a mobile electronic appliance.

The UFS host 6510, the UFS devices 6520 and 6530, the embedded UFS device 6540 and the removable UFS card 6550 may respectively communicate with external devices such as wired and/or wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 11. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 16:
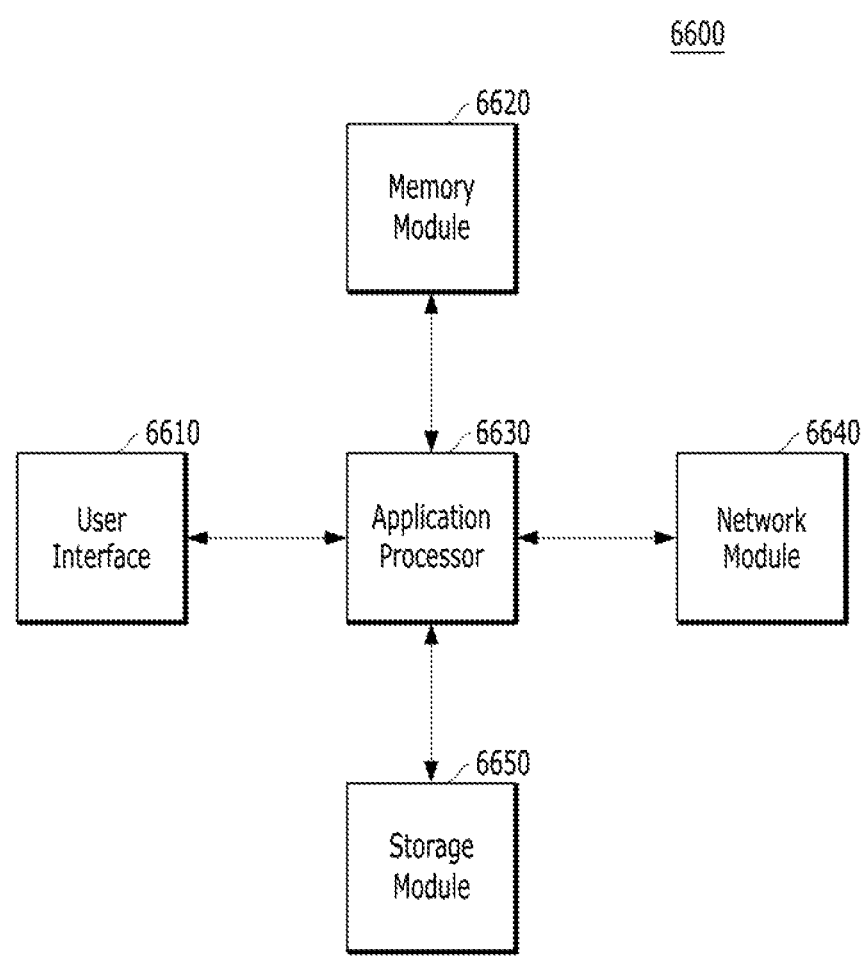

FIG. 16 is a diagram illustrating an example of a data processing system including the memory system according to an exemplary embodiment of the present invention. FIG. 16 is a drawing illustrating a user system 6600 to which the memory system according to an embodiment is applied.

Referring to FIG. 16, a user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, Interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase-change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired and/or wireless electronic appliances, for example, a mobile electronic appliance. According to this fact, the memory system and the data processing system according to an embodiment may be applied to wired and/or wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 13 to 15.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired and/or wireless communication with an external device, as described above. The user interface 6610 as the display/touch module of the mobile electronic appliance displays data processed by the application processor 6630 or supports input of data from a touch panel.

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
   a host suitable for selecting and loading any one of a plurality of operating systems (OSs); and
   a memory system comprising a memory device and a controller that includes a plurality of firmwares,
   wherein the controller enables any one of the firmwares based on the OS loaded to the host, and controls an operation of the memory system based on the enabled firmware,
   wherein the controller receives a command for selecting any one of the firmwares from the host, and sets and enables any one of the firmwares based on the command, and
   wherein the controller analyzes bit positions in a bit string contained in the command, and sets any one of the firmwares.

2. The data processing system of claim 1, wherein the bit positions are allocated to the respective firmwares.

3. The data processing system of claim 2, wherein the host selects any one of the OSs in response to a power-on, and loads the selected OS.

4. The data processing system of claim 3, wherein the host generates the command based on the selected OS, and then transmits the generated command to the memory system.

5. The data processing system of claim 4, wherein the host sets firmware which is to be enabled in the memory system, in response to the selected OS, and generates the command based on information for identifying the set firmware.

6. The data processing system of claim 5, wherein the host stores information on relations between the OSs and the firmwares.

7. The data processing system of claim 3, wherein the host provides a screen for selecting any one of the OSs to a user, in response to the power-on, and sets the selected OS among the OSs when any one of the OSs is selected by the user.

8. The data processing system of claim 1, wherein while the host is operated according to the loaded OS, the controller controls a data access operation requested for the memory device by the host, based on the enabled firmware.

9. An operating method of a data processing system which includes a host and a memory system, the operating method comprising:

providing a plurality of operating systems (OSs) in the host and a plurality of firmwares in the memory system;

selecting and loading, by the host, any one of the OSs;

selecting and enabling, by the memory system, any one of the firmwares, in response to the selecting and loading of any one of the OSs; and controlling an operation of a memory device included in the memory system, based on the firmware of the memory system, which is enabled at the selecting and enabling of any one of the firmwares, wherein the selecting and enabling of any one of the firmwares comprises:

generating, by the host, a command for selecting any one of the firmwares included in the memory system, and transmitting the generated command to the memory system; and setting and enabling, by the memory system, any one of the firmwares, based on the command transmitted to the memory system, wherein the setting and enabling of any one of the firmwares comprises analyzing, by the memory system, bit positions in a bit string contained in the command transmitted to the memory system, and setting and enabling any one of the firmwares.

10. The operating method of claim 9, wherein the bit positions are allocated to the respective firmwares.

11. The operating method of claim 10, wherein the selecting and loading of any one of the OSs comprises:

selecting, by the host, any one of the OSs in response to a power-on; and loading, by the host, the OS selected at the selecting of anyone of the OSs.

12. The operating method of claim 11, wherein the transmitting of the generated command comprises:

generating, by the host, the command based on the OS selected at the selecting of any one of the OSs; and transmitting the generated command to the memory system.

13. The operating method of claim 12, wherein the generating of the command comprises:

setting firmware which is to be enabled in the memory system, in response to the OS selected at the selecting of any one of the OSs; and generating, by the host, the command based on information for identifying the firmware set at the setting of the firmware.

14. The operating method of claim 13, wherein the host stores information on relations between the OSs and the firmwares.

15. The operating method of claim 11, wherein the selecting of any one of the OSs comprises:

providing a screen for selecting any one of the OSs to a user in response to the power-on; and setting the selected OS among the OSs, when any one of the OSs is selected by the user.

16. The operating method of claim 9, wherein the controlling of the operation of the memory device comprises controlling a data access operation requested for the memory device of the memory system by the host, based on the firmware of the memory system, which is enabled at the selecting and enabling of any one of the firmwares, while the host is operated according to the OS loaded at the selecting and loading of any one of the OSs.

* * * * *